United States Patent
Jacobs

(12) 
(10) Patent No.: US 6,618,788 B1
(45) Date of Patent: Sep. 9, 2003

(54) ATA DEVICE CONTROL VIA A PACKET-BASED INTERFACE

(75) Inventor: Daniel G. Jacobs, Meridian, ID (US)

(73) Assignee: Cypress Semiconductor, Inc., San Jose, CA (US)

( * ) Notice: Subject to any disclaimer, the term of this patent is extended or adjusted under 35 U.S.C. 154(b) by 0 days.

(21) Appl. No.: 09/671,554

(22) Filed: Sep. 27, 2000

(51) Int. Cl.⁷ .............................................. G06F 13/38
(52) U.S. Cl. .......................... 710/315; 710/22; 710/35
(58) Field of Search ............................... 710/305–317, 710/22, 35

(56) References Cited

U.S. PATENT DOCUMENTS

| | | | |
|---|---|---|---|
| 5,758,188 A | * | 5/1998 | Appelbaum et al. ........... 710/35 |
| 5,828,854 A | * | 10/1998 | Wade .......................... 710/315 |
| 6,175,883 B1 | * | 1/2001 | Kvamme et al. ............. 710/22 |
| 6,233,640 B1 | * | 5/2001 | Luke et al. .................. 710/315 |
| 6,366,980 B1 | * | 4/2002 | Haines et al. ................ 711/112 |

OTHER PUBLICATIONS

*Universal Serial Bus Mass Storage Class Specification Overview* (Revision 1.1, Jun. 28, 2000) (7 pages).

* cited by examiner

*Primary Examiner*—Rupal Dharia
(74) *Attorney, Agent, or Firm*—Marger Johnson & McCollom

(57) ABSTRACT

Methods and apparatus for remotely controlling an ATA device via a packet-based interface are disclosed. In one implementation, a remote host constructs command blocks corresponding to the ATA register-delivered commands that it would like executed. These command blocks are packetized and transported to a packet-to-ATA format bridge. At the bridge, each command block is parsed, and appropriate ATA read or write register commands are performed. The bridge performs requested data transfers via the packet-based interface.

This embodiment can allow a non-ATAPI ATA device to connect externally to a host computer, e.g., via a USB plug-and-play packet interface. This can provide inexpensive and portable mass storage capability that does not require internal mounting or external routing of the short ATA cables that are intended for internal use only. Although the host can have access to full ATA register-delivered functionality, it is also freed from the overhead of direct communication with an asynchronous ATA device, including interrupts and polling of that device.

27 Claims, 11 Drawing Sheets

| Byte \ Bit | 7 | 6 | 5 | 4 | 3 | 2 | 1 | 0 |
|---|---|---|---|---|---|---|---|---|
| 0 | \multicolumn{8}{c}{} |
| 1 | \multicolumn{8}{c}{dCBWSignature} |
| 2 | \multicolumn{8}{c}{(43425355h)} |
| 3 | | | | | | | | |
| 4 | | | | | | | | |
| 5 | \multicolumn{8}{c}{dCBWTag} |
| 6 | | | | | | | | |
| 7 | | | | | | | | |
| 8 | | | | | | | | |
| 9 | \multicolumn{8}{c}{dCBWTransferLength} |
| 10 | | | | | | | | |
| 11 | | | | | | | | |
| 12 | \multicolumn{8}{c}{bmCBWFlags} |
| 13 | \multicolumn{4}{c}{Reserved (0)} | \multicolumn{4}{c}{bCBWLUN} |
| 14 | \multicolumn{4}{c}{Reserved (0)} | \multicolumn{4}{c}{bCBWCBLength (16)} |
| 15 | \multicolumn{8}{c}{wATACBSignature} |
| 16 | \multicolumn{8}{c}{(2424h)} |
| 17 | 0 | \multicolumn{7}{c}{bmATACBActionSelect} |
| 18 | \multicolumn{8}{c}{bmATACBRegisterSelect} |
| 19 | \multicolumn{8}{c}{bATACBTransferBlockCount} |
| 20 | | | | | | | | |
| 21 | | | | | | | | |
| 22 | | | | | | | | |
| 23 | \multicolumn{8}{c}{bATACBTaskFileWriteData} |
| 24 | | | | | | | | |
| 25 | | | | | | | | |
| 26 | | | | | | | | |
| 27 | | | | | | | | |
| 28 | | | | | | | | |
| 29 | \multicolumn{8}{c}{Reserved (0)} |
| 30 | | | | | | | | |

Fig. 9

ATACB (bytes 15–30)

| Byte | Bit 7 | 6 | 5 | 4 | 3 | 2 | 1 | 0 |
|---|---|---|---|---|---|---|---|---|
| 0 | \multicolumn{8}{c}{} | | | | | | | |
| 1 | dCBWSignature | | | | | | | |
| 2 | (43425355h) | | | | | | | |
| 3 | | | | | | | | |
| 4 | | | | | | | | |
| 5 | dCBWTag | | | | | | | |
| 6 | | | | | | | | |
| 7 | | | | | | | | |
| 8 | | | | | | | | |
| 9 | dCBWTransferLength | | | | | | | |
| 10 | | | | | | | | |
| 11 | | | | | | | | |
| 12 | bmCBWFlags | | | | | | | |
| 13 | Reserved (0) | | | | bCBWLUN | | | |
| 14 | Reserved (0) | | | | bCBWCBLength (16) | | | |
| 15 | wATACBSignature | | | | | | | |
| 16 | (2424h) | | | | | | | |
| 17 | 1 | bmATACBActionSelect | | | | | | |
| 18 | bmATACBRegisterSelect | | | | | | | |
| 19 | bATACBTransferBlockCount | | | | | | | |
| 20 | bATACBDeviceHeadData | | | | | | | |
| 21 | Reserved (0) | | | | | | | |
| 22 | | | | | | | | |
| 23 | | | | | | | | |
| 24 | | | | | | | | |
| 25 | | | | | | | | |
| 26 | bATACBTaskFileWriteData | | | | | | | |
| 27 | | | | | | | | |
| 28 | | | | | | | | |
| 29 | | | | | | | | |
| 30 | | | | | | | | |

Bytes 15–30: ATACB

Fig. 10

ATA DEVICE CONTROL VIA A PACKET-BASED INTERFACE

FIELD OF THE INVENTION

This present invention relates to ATA (Advanced Technology Attachment) device control, and more particularly to systems and methods for interfacing a host with an ATA device using an intervening packet data channel.

BACKGROUND OF THE INVENTION

An "ATA" device is a data device that complies with an ANSI (American National Standards Institute) ATA standard, for instance the standard "AT Attachment with Packet Interface Extension—(ATA/ATAPI-4)" or one of its predecessors. Future ATA standards are also currently contemplated; devices compliant with these standards will also be "ATA devices". Most personal computers have built-in ATA device support, and most of these come equipped with ATA internal hard drives.

The ATA standards define the physical, electrical, transport, and command protocols for the internal attachment of devices to computers via an ATA bus. Referring to FIG. 1, a typical configuration for a computer 20 capable of using one or more ATA data devices is shown. A host processor 22 communicates with main memory 24 (e.g., a memory controller attached to one or more memory modules via a memory bus) over a frontside bus 28. Host processor 22 (and main memory 24) can also communicate with a variety of other system peripherals through PCI (Peripheral Component Interconnect) bridge 26 and PCI local bus 30.

The bandwidth on PCI local bus 30 can be shared by a variety of computer components, some of which are depicted in FIG. 1. For instance, internal PCI-compliant devices such as modems, sound cards, video cards, etc. can be attached to computer 20 via PCI card slots 32 and 34 (the number of available slots varies from computer model to computer model) on the computer motherboard. In addition, USB (Universal Serial Bus) interface 36 provides a number of USB ports 38 for the attachment of a wide variety of external devices, such as a mouse, a keyboard, a digital camera, audio devices, printers, etc. And ATA host adapter 40 performs signal conversion between PCI local bus 30 and yet another bus, ATA bus 42.

ATA bus 42 is typically implemented as a multi-drop bus using a flexible 40-conductor cable having three 40-pin connectors, each of which can mate to a corresponding socket on the computer's motherboard or on an ATA device (the ATA devices themselves mount within the computer case). Up to two ATA devices (e.g., devices 44 and 46 on FIG. 1) can share ATA bus 42. The primary device is known as device 0, or the "master" when two devices are present. The secondary device is known as device 1, or the "slave". For most ATA operations, only one of devices 44 and 46 will respond to the host's commands, that device being the one corresponding to the state of the "DEV" bit in the Device/Head Register (to be discussed shortly).

FIG. 2 illustrates several concepts related to ATA communication between an ATA host and an ATA device. ATA bus 42 uses an asynchronous interface protocol. Bus 42 comprises a 16-bit data bus 52, used to transfer storage data and register values to and from ATA device 44. Five-bit register addressing bus 54 is used by the host to tell device 44 which register's contents are to be accessed. Device signals 56 and host signals 58 are used to indicate when bus contents are valid, to indicate whether a register access is a read or a write, to synchronize transfers, and to perform device resets.

All communications with a traditional ATA device 44 take place via register-delivered commands. Within device 44, a device controller 50 maintains a set of registers. In FIG. 2, this set of registers has been arranged in three groups: write-only registers 60 (registers that can only be written by the host); read-only registers 62 (registers that can only be written by the device); and read/write registers 64. A register-delivered command is executed whenever the host writes to the Command register. For instance, the READ MULTIPLE command causes multiple sectors to be read from the device in PIO data-in mode (Programmed Input/Output mode data transfers are performed by the host processor utilizing programmed register accesses to the Data register). To perform a READ MULTIPLE command, the host places the number of data sectors to be transferred in the Sector Count register, the starting sector number in the Sector Number register, the starting cylinder number in the Cylinder High/Cylinder Low registers, and the device number and starting head number in the Device/Head register. The READ MULTIPLE command code (C4h) is then written to the Command register, causing ATA device 44 to evaluate the other register's contents and perform the requested read.

Device 44 indicates the status of the command using the bit fields of the Status register. If an error occurs, device 44 will report on the error using the Error register and several other registers. Note that it is the host's job to read the registers and ascertain the status of the device.

The ATA standard includes an alternative to register-delivered commands that is better suited to devices such as CD-ROM and tape devices. The ATAPI (ATA Packet Interface) specifies a method for controlling a storage device over an ATA bus using packet-delivered commands. Although an ATAPI device and an ATA device can share an ATA bus, a single device cannot identify itself simultaneously as both an ATA device and as an ATAPI device. An ATAPI device supports a very small subset of the traditional ATA command set—for most of its functions, an ATAPI device receives ATAPI packet-delivered transport protocol commands. An ATAPI packet is received by the device as data upon receipt by the device of the ATA ATAPI-specific PACKET command in the Command register.

The ATAPI transport protocol, like traditional ATA, was designed for use with internally-mounted drives and with a host that places ATAPI packets directly on the ATA bus. But because most functions of an ATAPI device can be exercised using ATAPI packets, methods have now been devised to use an intermediate transport protocol and a different physical transport media—those provided by USB—to allow external connection of an ATAPI device to a host computer. This method relies only on the packet-delivered commands of ATAPI to communicate with an ATAPI device. FIG. 3 illustrates a communication stack 70 that operates according to such a method.

In FIG. 3, a physical device 90, which includes an ATAPI device 100, physically connects to a host 80 via a USB PHY connection 99, e.g., a USB cable or an intervening USB hub. When host 80 desires to execute an ATAPI function on ATAPI device 100, host 80 calls ATAPI driver 82. ATAPI driver 82 sends an appropriate ATAPI transport protocol command, along with an indication as to the amount of data (if any) that is expected to be transferred and an indication of the "Logical Unit" that is to be addressed, to MSC (Mass Storage Class) driver 84.

Logically, MSC driver 84 communicates with MSC logical device 96 on physical device 90 to transport the ATAPI command packet and data between host 80 and physical device 90. Together, driver 84 and logical device 96 operate according to the specification "Universal Serial Bus Mass Storage Class—Bulk-Only Transport", Rev. 1.0, USB Implementers Forum, Sep. 31, 1999. According to this specification, two USB logical pipes (Bulk-In Pipe 110 and Bulk-Out Pipe 112) are established between the two USB endpoints (in addition to the Default Pipe 114 that exists between USB driver 86 and USB logical device 94). The two devices pass MSC-formatted command and data packets over these two logical pipes. Physically, driver 84 and logical device 96 communicate via the USB PHY 99 that is established between USB host controller 88 (on host 80) and USB bus interface 92 (on device 90).

ATAPI command execution proceeds in three MSC steps, as shown in flowchart 120 of FIG. 4. The ATAPI transport protocol packet is encapsulated in an MSC-valid and-meaningful command block wrapper (CBW) at command transport step 122. Using bulk-out pipe 112, the CBW is communicated to MSC logical device 96. Then, if the host is writing data to the storage device, data-out block 124 transfers the data to MSC logical device 96 over bulk-out pipe 112. Or, if the host is reading data from the storage device, data-in block 126 transfers the data to MSC driver 84 over bulk-in pipe 110. Finally, in status transport step 128, MSC logical device 96 transfers a command status wrapper (CSW) back o MSC driver 84, indicating that the command has completed.

Returning to FIG. 3, two additional blocks, ATA host 97 and ATA interface 98, complete the communication path to ATAPI device 100. ATA host 97 issues ATA PACKET commands to ATAPI device 100, and then controls transfer of ATAPI command packets and data between ATAPI logical host 96 and ATAPI device 100. ATA interface 98 provides the low-level timing, handshaking, and signal-driving necessary to communicate with ATAPI device 100 over ATA PHY 101.

SUMMARY OF THE INVENTION

Although the ATAPI-over-USB functionality provided by a configuration such as that shown in FIG. 3 is certainly useful, it is recognized herein that it also possesses a number of inherent limitations. For instance, there is no mechanism to allow full visibility by ATAPI driver into the registers of ATAPI device 100—when ATAPI driver 82 issues an ATAPI command, it receives back only a status indication as to whether the command passed, failed, or caused a phase error. Perhaps even more important, the configuration in FIG. 3 only allows the host to issue ATAPI packet-delivered commands to ATAPI devices.

The disclosed embodiments contemplate a packet-based method and apparatus for executing register-delivered ATA commands. These embodiments provide many benefits. First, a host can use, e.g., a USB plug-and-play connection to access an external ATA hard drive or other non-ATAPI ATA device. This allows the main benefits of an ATA hard drive (large storage size at low cost) to be offered in a portable or add-on configuration. Second, these embodiments can allow a host to have full flexible access to an ATAPI device's ATA registers and to execute up to the full set of ATA commands that the ATAPI device can recognize. Also, a host without an ATA hardware bus, a full ATA bus, or one where it is desired to operate without the difficulties of asynchronous communication with an ATA device, can attach itself to an ATA device via a packet port. And finally, some of the disclosed embodiments can operate within the design parameters of the USB MSC protocol, making the command transport implementation straightforward. In a particularly preferred implementation, a complete ATA register-delivered command sequence can be performed using a single CBW/Data/CSW MSC transaction-this not only makes the implementation efficient, but solves many timing issues that could occur were each register operation placed in a separate packet.

In one aspect of the invention, a method is disclosed for controlling an ATA device using packet-based communication between a host and a packet-to-ATA bridge. The host formats the ATA register accesses necessary to execute a given ATA register-delivered transaction into a command block. The host transmits the command block to the packet-to-ATA bridge in a packet format. The bridge parses the command block into a sequence of ATA operations necessary to execute the given ATA register-delivered transaction. The bridge then communicates with an ATA device attached to the bridge via an ATA interface to execute the sequence of ATA operations on the ATA device. When the given ATA register-delivered transaction requests the values for one or more registers on the ATA device, the bridge returns the register values to the host in packet format.

The portions of the method above that are performed by the bridge form another aspect of the invention. The methods can be performed by hardware, software, or a combination of the two.

In yet another aspect of the invention, an apparatus comprising a packet-to-ATA bridge is disclosed. The bridge comprises a packet data interface to receive ATA register-delivered-command packets and data packets from a remote host, and to transmit data and status packets to the remote host. The bridge also comprises an ATA interface to transmit ATA bus host signals to an ATA device and receive ATA device signals from the device. Buffer memory is included to buffer data between the packet data interface and the ATA interface. An ATA register protocol adapter connects to the ATA interface—this adapter is capable of performing ATA register operations with an ATA device attached to the ATA signal interface. And an ATA command protocol adapter is included to parse a command packet into a sequence of ATA register operations and cause that sequence of operations to be performed by the ATA register protocol adapter.

The apparatus can be the bridge alone, e.g., implemented on an integrated circuit. The apparatus can also be a "smart" cable that includes the bridge. Or, the apparatus can comprises both the bridge and the ATA device in a single package.

BRIEF DESCRIPTION OF THE DRAWING

The invention may be best understood by reading the disclosure with reference to the drawing, wherein:

FIGS. 9 and 10 show command block wrapper formats useful with embodiments of the invention;

DETAILED DESCRIPTION OF THE PREFERRED EMBODIMENTS

Figure 1:
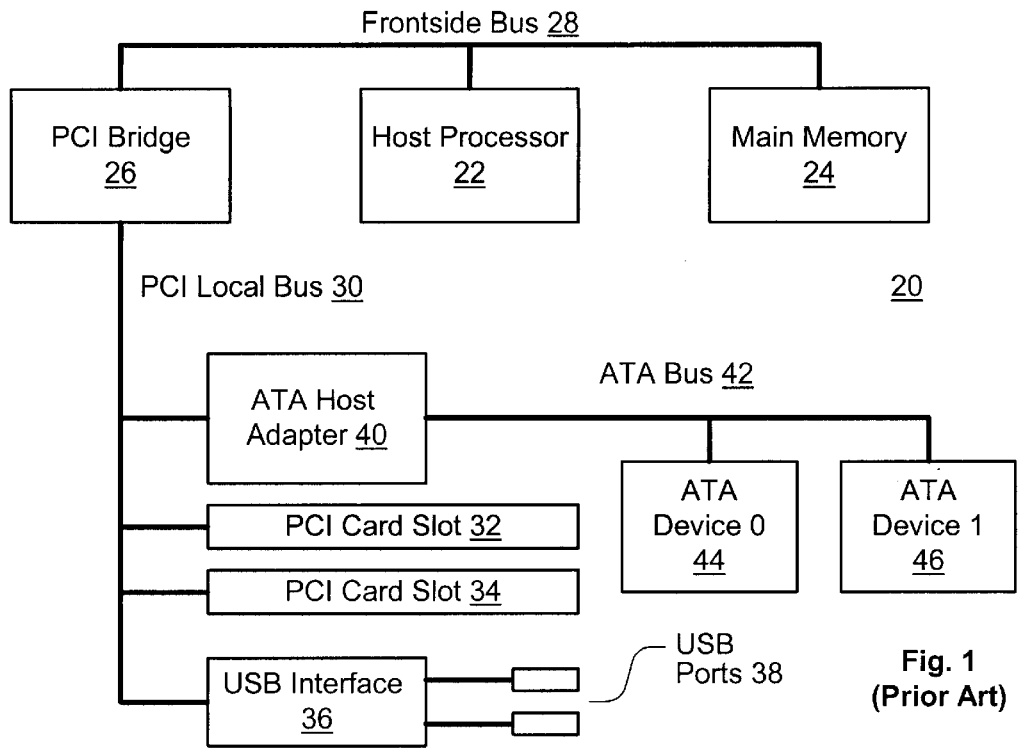
FIG. 1 illustrates a block diagram for a prior art computer configuration.
Figure 2:
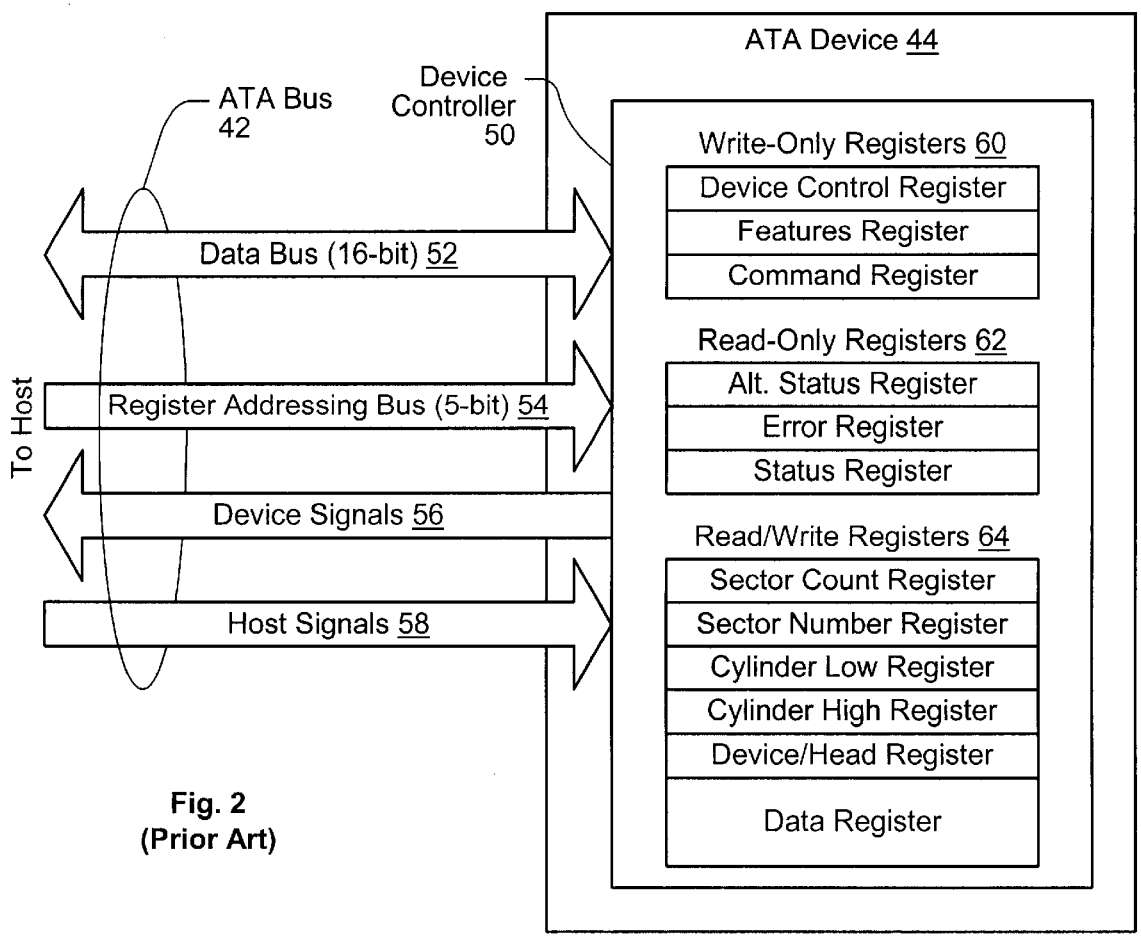
FIG. 2 shows the main signal groups of an ATA bus and registers of an ATA device.
Figure 3:
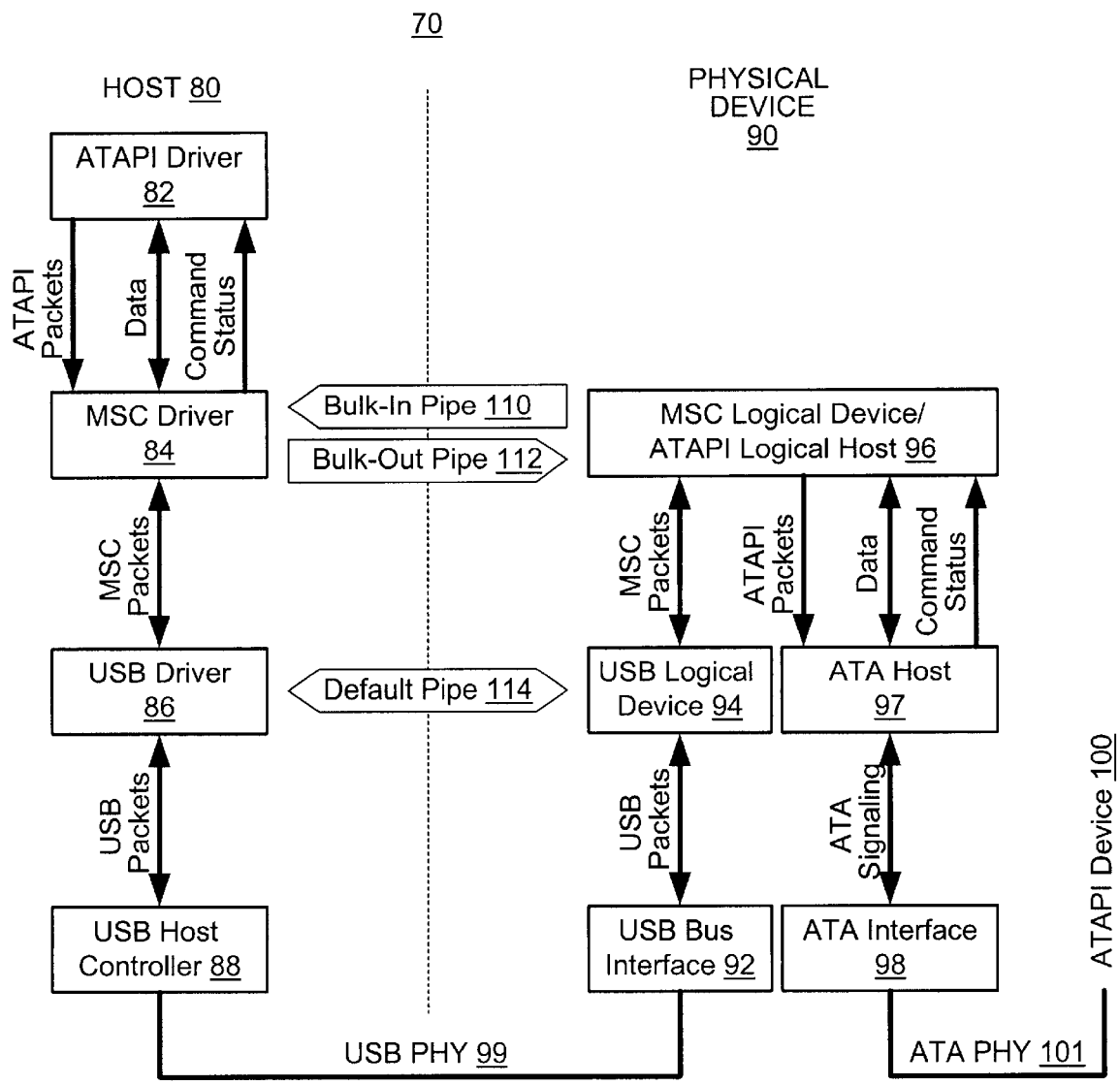
FIG. 3 shows a communication stack for a prior art method of controlling an ATAPI device over a USB connection.
Figure 4:
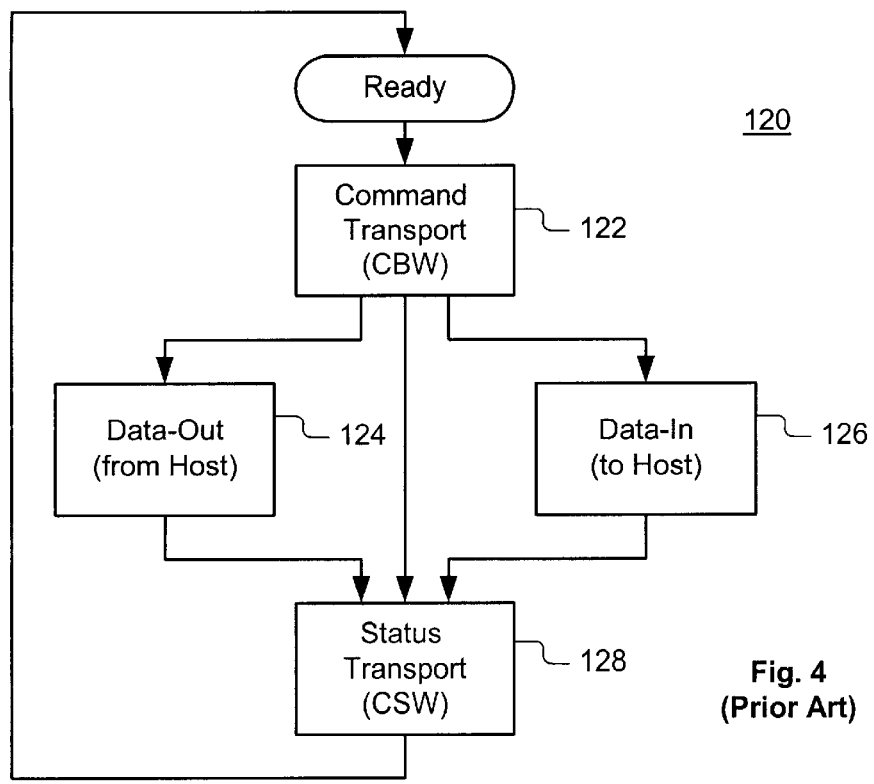
FIG. 4 shows the communication states of a USB MSC transaction.
Figure 5:
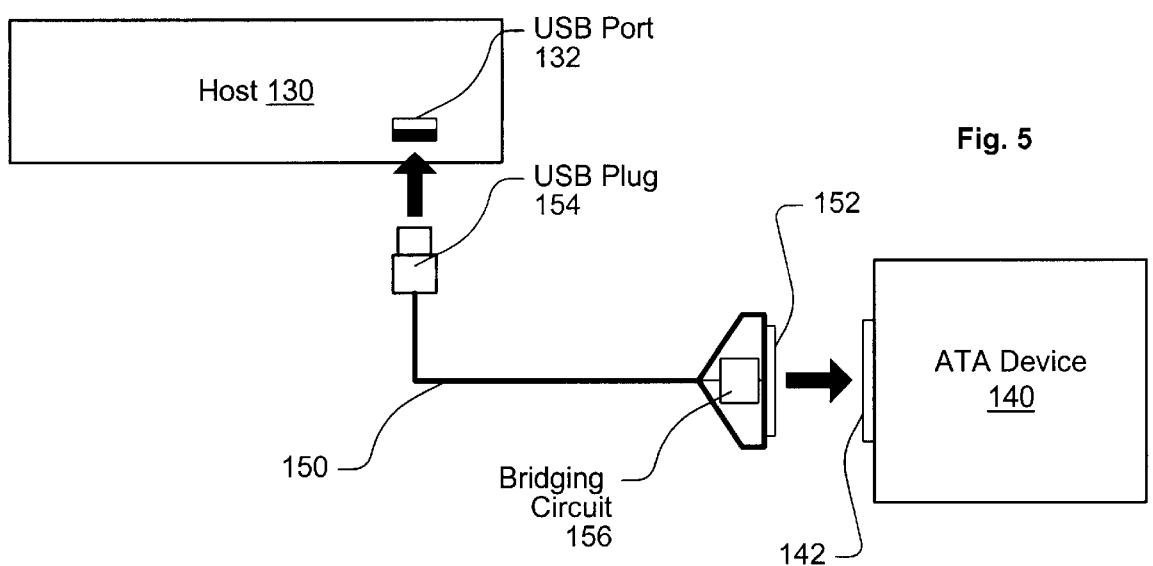
FIGS. 5 and 6 illustrate two computer/external ATA device configurations according to embodiments of the invention.
Figure 6:
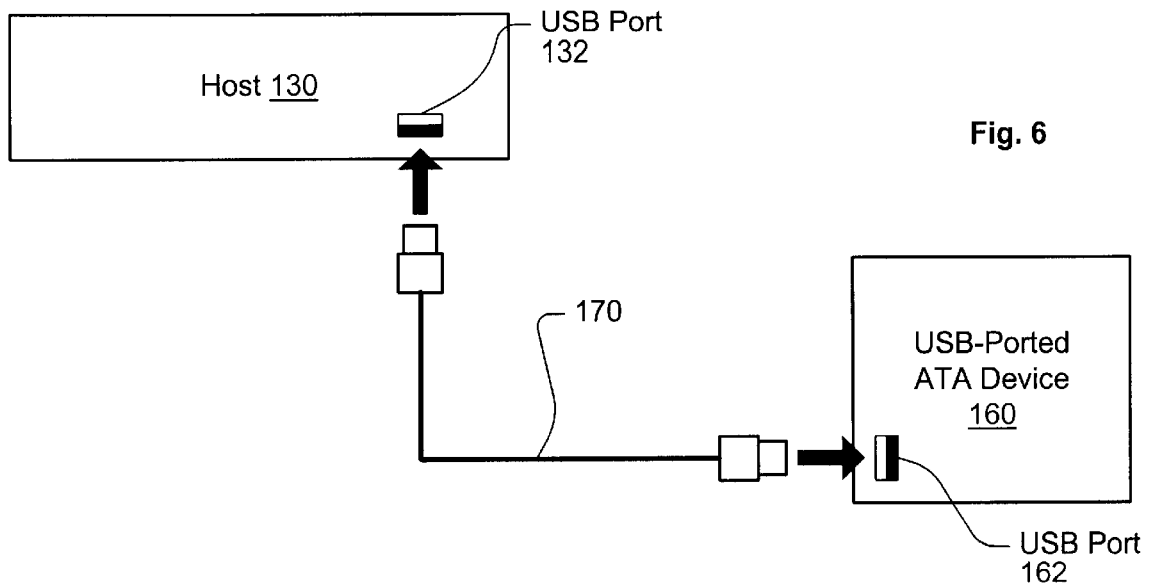

A contemplated use of the present invention is for control of an ATA device from a host connected to the device by a packet-based connection. FIGS. 5 and 6 depict two possible configurations according to this use. In FIG. 5, a host 130 connects to an ATA device 140 via a "smart cable" 150. In FIG. 6, a host 130 connects to a USB-ported ATA device 160.

Referring first to FIG. 5, host 130 contains USB host and ATA host drivers, and provides a USB upstream port 132. ATA device 140 can be a traditional ATA device with a socket 142. Although the socket can be an ATA socket, a more durable socket that can be locked to a connector and can hold up under repeated connect/disconnect cycles is preferable. Likewise, ATA device 140 will preferably be placed in some type of protective enclosure, and may come with its own power supply. And although the following discussion will focus on a single ATA DEV0, ATA device 140 could also incorporate two physical devices, one functioning as DEV0 and the other as DEV1 on the same ATA bus.

Smart cable 150 provides a bridging function between the USB and ATA formats. Cable 150 has a connector 152 at one end, adapted to mate to socket 142 on device 140. On the opposite end, cable 150 has an upstream USB plug 154. A bridging circuit 156 mounts in the connector housing for connector 152. To the USB host, smart cable 150 appears as a bus-powered USB function (although it may alternately be self-powered or receive power from connector 152). To ATA device 140, smart cable 150 appears to be an ATA host adapter.

FIG. 6 shows a configuration that uses a standard USB cable 170 and a USB-ported ATA device 160. In this second configuration, host 130 can be provisioned identically to the first configuration. But bridging circuit 156 of FIG. 5 has been physically incorporated into ATA device 160. Typically, device 160 will appear to the USB host as a self-powered USB function, unless the power requirements of device 160 are such that a bus-powered implementation is feasible.

Figure 7:
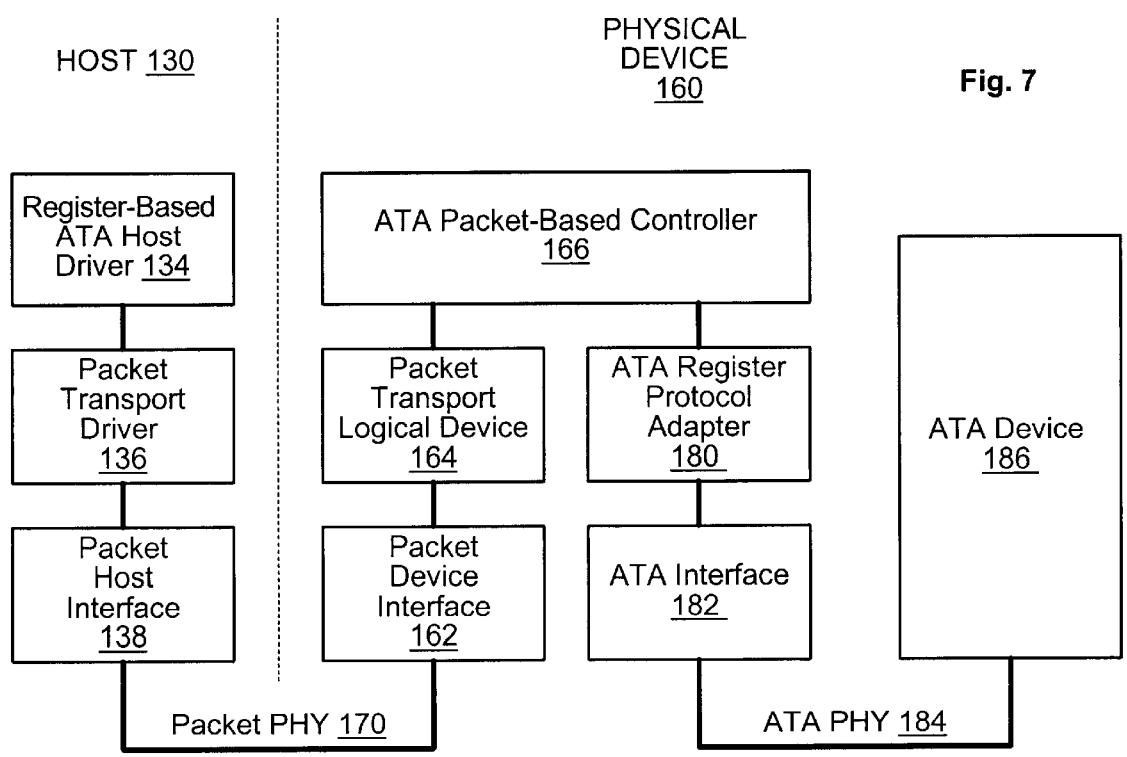
FIG. 7 shows a communication stack for a general embodiment of the invention.

FIG. 7 shows a generalized communication stack useful with the configurations depicted in FIGS. 5 and 6 (the numbering shown is for FIG. 6, although FIG. 7 is equally applicable to FIG. 5). On the host side, a register-based ATA host driver 134 has functionality comparable to that of an ATA driver used with an onboard ATA bus. Additionally, driver 134 understands how to construct ATA command blocks (to be described shortly) and possibly deconstruct returned register packets in order to perform register-delivered ATA transactions.

Packet transport driver 136 provides the capability for reliable transport of command and data packets across packet PHY 170. Packet host interface 138 provides link-layer connectivity to physical device 160.

On the physical device side, packet device interface 162 provides link-layer connectivity and packet transport logical device 164 provides transport layer capability. Logical device 164 interfaces with ATA packet-based controller 166 to provide controller 166 connectivity to register-based ATA host driver 134.

ATA packet-based controller 166 interprets and acts on ATA command blocks from register-based ATA host driver 134. In other words, controller 166 provides the main packet-to-register ATA command bridging functionality. When controller 166 receives an ATA command block, it recognizes the command block as such, checks it for inconsistencies, and parses it into a sequence of ATA register accesses. The ATA register access sequence is delivered to ATA register protocol adapter 180 for execution. In data output cases, register protocol adapter 180 will hand data to controller 166 for ATA delivery. In data input or register-read cases, register protocol adapter 180 will return register data to controller 166 for packet delivery back to host driver 134.

ATA register protocol adapter 180 contains the functionality necessary for asynchronous communication with ATA device 186. This includes low-level services for register access and related signaling. ATA interface 182 provides drivers and buffers to generate and read ATA-level signals on ATA PHY 184.

Figure 8:
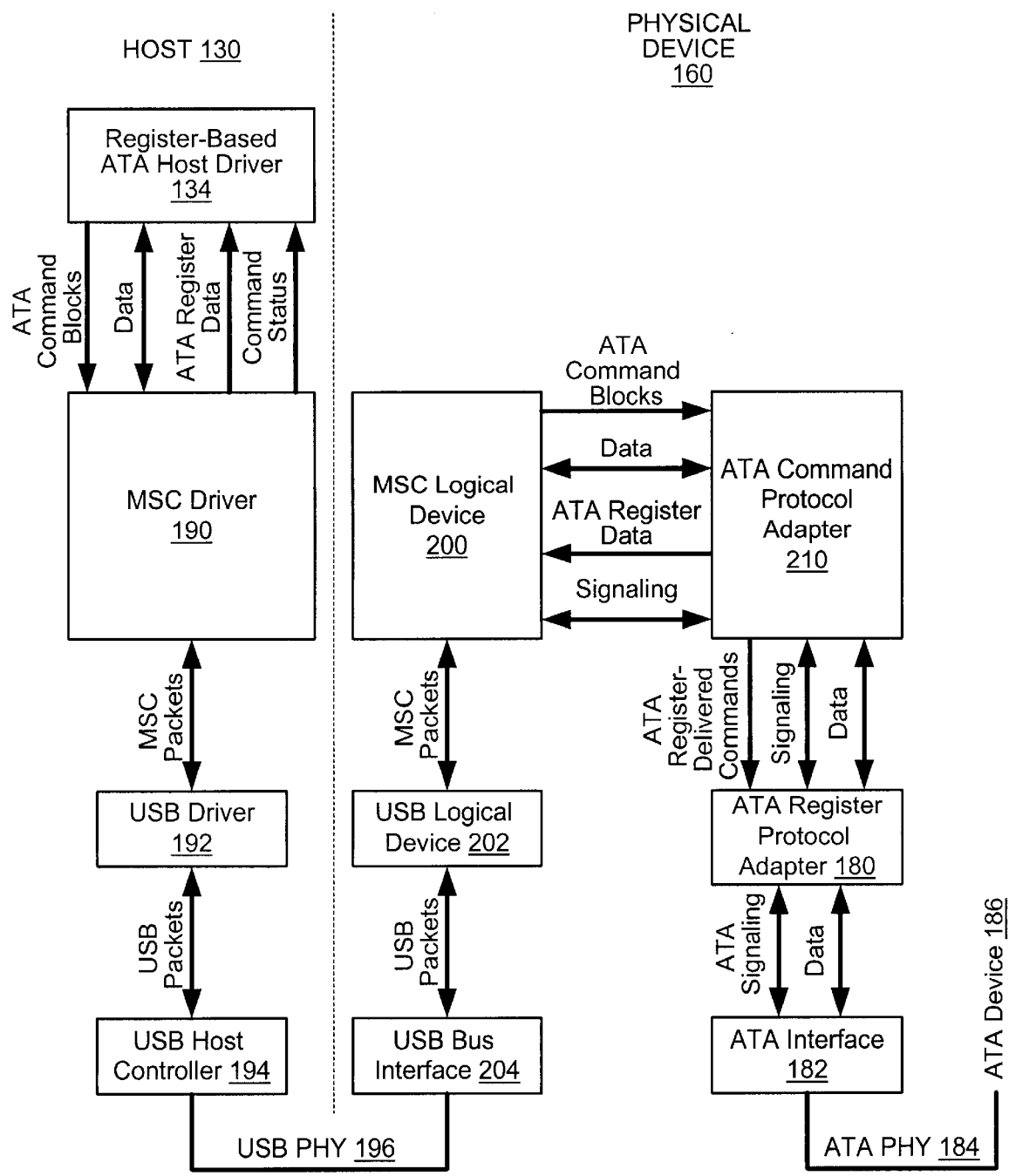
FIG. 8 shows a communication stack for a USB MSC embodiment of the invention.

FIG. 8 shows a more specific communication stack for use with a USB packet PHY and a USB Mass Storage Class-type driver. Register-based ATA host driver 134 provides an ATA command block (ATACB, to be discussed shortly) and write data (if applicable) to MSC driver 190. MSC driver 190 places each ATACB in a command block wrapper (CBW) and sends it to MSC logical device 200 using an MSC bulk-out pipe (not shown). MSC logical device 200 removes the ATACB from the CBW, recognizes the ATACB as such, and sends it to the ATA command protocol adapter 210. ATA command protocol adapter 210 performs the requested register-delivered commands/register accesses, and returns any resulting register/media data to MSC logical device 200. When the transaction requested in the ATACB is complete, adapter 210 provides a status signal back to logical device 200, which constructs a command status wrapper (CSW) and transmits the status back to MSC driver 190 (and, consequently, driver 134).

FIG. 9 shows one preferred format for a command block wrapper MSC packet—including an ATA command block—according to an embodiment of the invention. The CBW is 31 bytes long. Bytes 0–14 are filled in by MSC driver 190; Bytes 15–30 are copied from the ATACB supplied by ATA host driver 134.

The first field (bytes. 0–3) is a command block wrapper signature field containing a specific signature dCBWSignature that helps identify the data packet as a CBW. The next field (bytes 4–7) contains a command block tag dCBWTag. This tag identifies a particular command block, and will be echoed back to driver 190 in the Command Status Wrapper (CSW) when the command completes. Bytes 8–11 contain a value dCBWTransferLength representing the number of bytes of data that the host expects to transfer on the Bulk-In or Bulk-Out endpoint during the execution of the command. Byte 12 contains a collection of bit-mapped flags bmCBW-Flags. The only bit currently used is bit 7, the Direction bit. When data is to be transferred during the execution of the command, Direction is set to 0 when the data will flow on the Bulk-Out pipe to the ATA device, and is set to 1 when the data will flow on the Bulk-In pipe to the host. Bits 0–3 of byte 13 contain a logical unit number bCBWLun that may be useful in an implementation where the command block interpreter serves more than one logical unit. Bits 0–5 of byte 14 contain a length value bCBWCBLength—this value indicates the number of valid bytes in the following command block, and may be any number between 1 and 16, inclusive. For instance, the command block in FIG. 9 is 16 bytes long (although the last three bytes are unused); thus, bCBWCBLength will always be set to 16 for a command block in this format.

Bytes 15–27 contain the ATACB-specific fields for an ATA command block. An ATA command block is distinguished from other types of command blocks by its first two bytes (bytes 15–16), which contain the signature wATACB-Signature (in this embodiment the signature is always set to 2424h, where "h" represents hexidecimal notation). Only command blocks that have this signature can be interpreted as ATA command blocks.

Byte 17 contains a set of bit-mapped execution flags bmATACBActionSelect. The definition of each bit is shown in Table 1. In general, these bits define how the bridging device is to interpret and execute the commands/register accesses that follow.

TABLE 1

Figure 12A:
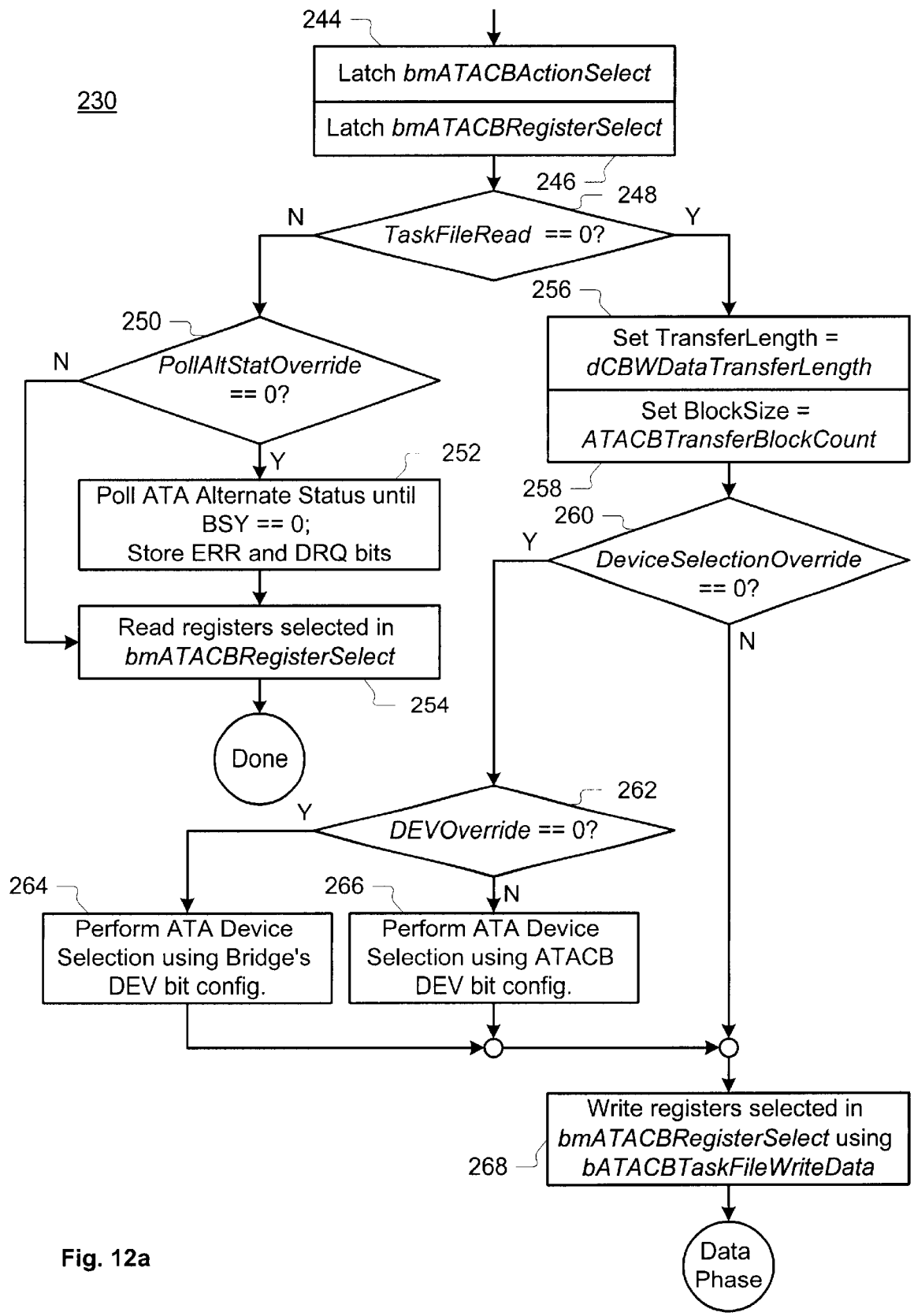
FIGS. 12a, 12b, and 12c show a flowchart for one method of operating a USB-ATA bridge according to an embodiment of the invention.
Figure 12B:
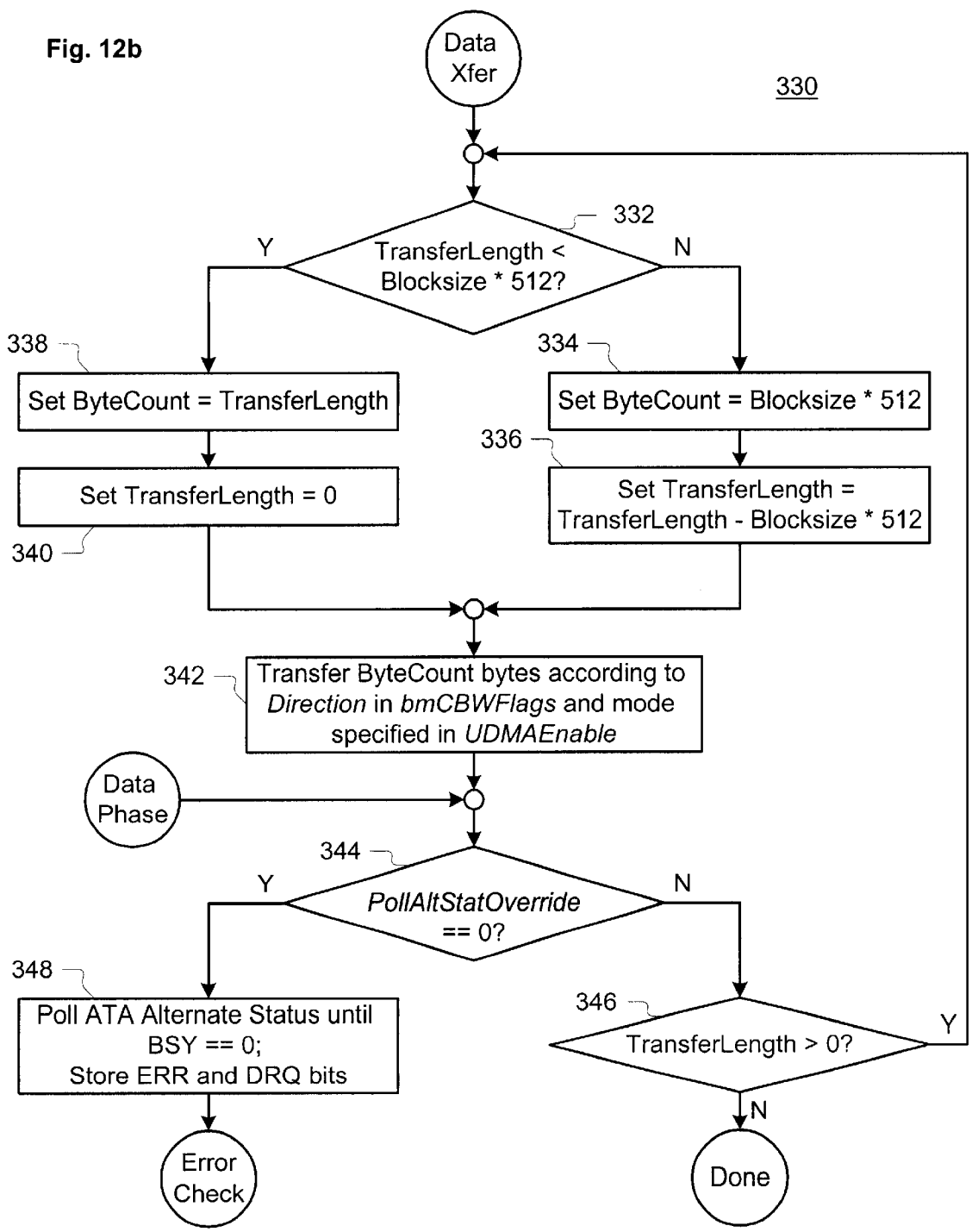
Figure 12C:
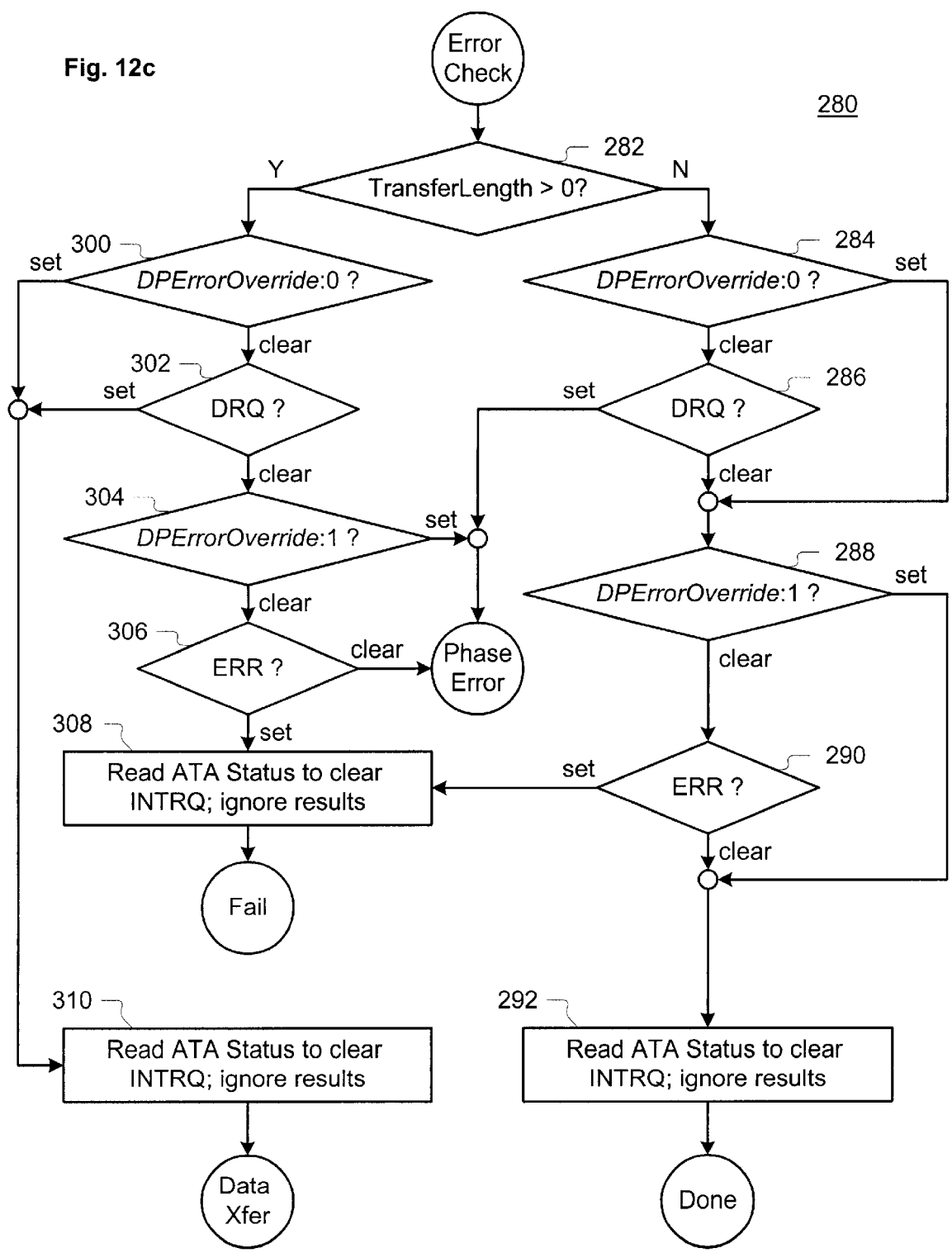

| Bit | Name | Function |
|---|---|---|
| 0 | TaskFileRead | Read and return the task file register data selected in bmATACBRegisterSelect. If TaskFileRead is set, the dCBWDataTransferLength field must be set to 8.<br>0 = Execute ATACB command using values set in bATACBTaskFileWriteData and perform data transfer (if any).<br>1 = Only task file registers selected in bmATACBRegisterSelect are read. Task file registers not selected in bmATACBRegisterSelect shall not be accessed and 00h is returned for the unselected register data. |
| 1 | DeviceSelection Override | This bit shall not be set in conjunction with bmATACBActionSelect TaskFileRead.<br>0 = Device selection is performed prior to command register write accesses.<br>1 = Device selection shall not be performed prior to command register write accesses. |
| 2 | PollAltStatOverride | 0 = The Alternate Status register is polled until BSY=0 before proceding with the ATACB operation.<br>1 = Execution of the ATACB shall proceed with the data transfer without polling the Alternate Status register until BSY=0. |
| 3–4 | DPErrorOverride | Device and Phase Error Override. These bits shall not be set in conjunction with bmATACBActionSelect TaskFileRead. The order of precedence for error override is dependent on the amount of data left to transfer when the error is detected, as depicted in FIG. 12c.<br>00 = Data accesses are halted if a device or phase error is detected.<br>01 = Phase error conditions are not used to qualify the occurrence of data accesses.<br>10 = Device error conditions are not used to qualify the occurrence of data accesses.<br>11 = Neither device error nor phase error conditions are used to qualify the occurrence of data accesses. |
| 5 | DEVOverride | Use the DEV value specified in the ATACB.<br>0 = The DEV bit value will be determined from an internal configuration bit. |

TABLE 1-continued

| Bit | Name | Function |
|---|---|---|
|  |  | 1 = Then DEV bit value will be determined from the ATACB(11 bit 5). |
| 6 | UDMAEnable | 0 = Use PIO mode for data transfers.<br>1 = Use Ultra DMA for data transfers. |
| 7 | ATACBFormat | Indicates which ATACB format is used for this CB.<br>0 = Original ATACB format.<br>1 = Alternate ATACB format. |

Byte 18 contains a set of bit-mapped register flags bmATACBRegisterSelect. The definition of each bit is shown in Table 1. When the command block is writing register values to the device, bmATACBRegisterSelect indicates which registers are to be written. Similarly, when the command block is requesting a read from device register, bmATACBRegisterselected indicates which registers are to be read. Register accesses occur in the sequential order show (bit 0 first). If a register is unselected, the value 00h should be returned for that register.

TABLE 2

| Bit | Read Register (TaskFileRead == 1) | Write Register (TaskFileRead == 0) |
|---|---|---|
| 0 | Alternate Status | Device Control |
| 1 | Error | Features |
| 2 | Sector Count | Sector Count |
| 3 | Sector Number | Sector Number |
| 4 | Cylinder Low | Cylinder Low |
| 5 | Cylinder High | Cylinder High |
| 6 | Device/Head | Device/Head |
| 7 | Status | Command |

Byte 19 contains the value bATACBTransferBlockCount. For multiple-block access commands, this value should be set to the value last used for "Sectors per block" in the "SET_MULTIPLE_Mode" ATA command. For other commands, this value should be set to 1, indicating a block size of 512 bytes. Valid values are 1, 2, 4, 8, 16, 32, 64, 128, and 0 (which maps to 256). If the bridge detects any other value here, command failed status will be returned to the host.

Bytes 20–27, bATACBTaskFileWriteData carry write data when the ATACB requests that the ATA device registers are to be written to. The byte order corresponds to the bit order defined for byte 18, i.e., byte 20 corresponds to bit 0 of bmATACBRegisterSelect, and thus carries the value for the Device Control register, etc. A particular byte need not contain a valid register value if its corresponding bmATACBRegisterSelect bit value is 0.

FIG. 10 shows an alternate command block wrapper format. This format is similar to FIG. 9, with a few changes. First, bit 7 of byte 17 is set to 1, indicating that this command block is in the alternate format. Second, a new field, bATACBDeviceHeadData, has been inserted at byte 20. This field replaces the Device/Head register field of bATACBTaskFileWriteData operationally, although the replaced field remains as an unused placeholder in the command block structure. The third format change is that bATACBTaskFileWriteData shifts to the end of the CBW (bytes 23–30).

The alternate format can be advantageous in several situations. First, it can be used with either a register read or a register write where the device is selected by the command block (DeviceSelectionOverride must be set to 0 for this to occur), whereas by definition the first format cannot perform device selection when registers are to be read. Second, since the bATACBDeviceHeadData value is positioned forward in the command block, a state machine bridging implementation can begin the device-setting operation before receiving bATACBTaskFileWriteData, thus simplifying state machine operation and improving response time.

Figure 11:
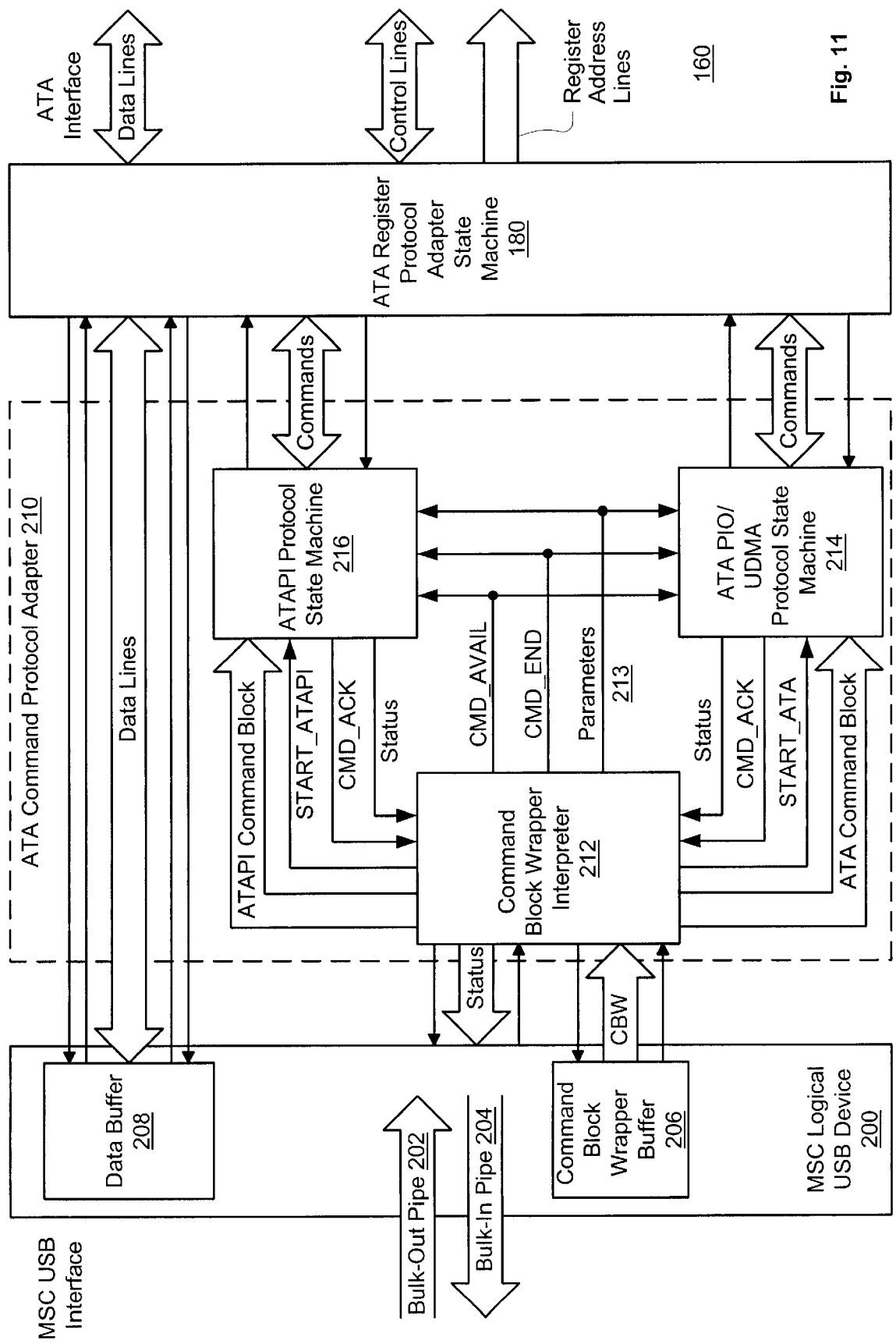
FIG. 11 depicts a block diagram for a hardware USB-ATA bridge according to an embodiment of the invention.

FIG. 11 shows a preferred embodiment for a USB-to-ATA bridging device 160 (the USB logical device and bus interface have been omitted in order that the internal signal paths can be displayed on one page). Three main blocks are shown: MSC logical USB device 200; ATA command protocol adapter 210; and ATA register protocol adapter state machine 180. Each block will be discussed in turn.

MSC logical USB device 200 peers with the host's MSC driver to provide delivery of command blocks, data, and status blocks via Bulk-Out Pipe 202 and Bulk-In Pipe 204. When a command block wrapper (CBW) arrives from the host on pipe 202, it is checked by logical device 200 for validity and meaningfulness. If the CBW passes these checks, the command block wrapper is placed in command block wrapper buffer 206.

Command block wrapper buffer 206 allows the host to issue multiple consecutive commands without having to wait for the preceding command to finish in each case. Buffer 206 connects to command block wrapper interpreter 212 via a command block wrapper transfer path and associated transfer handshaking signals. Buffer 206 supplies command block wrappers to command block wrapper interpreter 212 one at a time. When interpreter 212 returns status for the current command to logical device 200, command block wrapper buffer 206 will release the next command block wrapper if one is queued.

Data buffer 208 of logical device 200 provides bi-directional data buffering at the USB-to-ATA interface. Buffer 208 connects to ATA register protocol adapter state machine 180 via a bi-directional data transfer path and associated transfer handshaking signals. When a CBW indicates that data is to be written to the ATA device, the data is received on Bulk-Out Pipe 202 and stored in data buffer 208 for release to the ATA register protocol adapter. Similarly, when a CBW indicates that data (or register values) are to be read from the ATA register protocol adapter, data buffer 208 will receive the data from the ATA device and place the data on Bulk-In Pipe 204 for transfer to the host.

ATA command protocol adapter 210 comprises three main functional blocks. Command block wrapper interpreter 212 understands how to communicate with an MSC logical USB device via command and status blocks and how to submit command blocks to an appropriate protocol state machine. ATA PIO/UDMA (Programmed Input/Output/Ultra DMA) protocol state machine 214 receives ATA command blocks from interpreter 212 and initiates appropriate ATA transactions. Preferably, an ATAPI protocol state machine 216 also connects to interpreter 212, allowing the device to process ATAPI command packets as well.

Command block wrapper interpreter 212 can receive both ATA command blocks and ATAPI command blocks. It distinguishes an ATA command block by locating the signature 2424h in the wATACBSignature command block position. When the ATA signature is detected, interpreter 212 signals ATA protocol state machine 214 with the START_ATA command. State machine 214 returns a signal CMD_ACK indicating that it is ready for transfer of the ATA command block. Interpreter 212 asserts CMD_AVAIL when the first byte of the ATA command block is ready for transfer, and state machine 214 asserts CMD_ACK again when that byte has been clocked. This process continues until the entire command block has been clocked into state machine 214, at which point interpreter 212 asserts the CMD_END signal. Note also that during the command transfer, the data transfer length and direction are passed to state machine 214 over the parameters connection 213.

When a command block is received, interpreter 212 first checks that the proper wATACBSignature exists in the command block; if not, the command block is transferred to ATAPI protocol state machine 216 using timing similar to that used above.

The ATA command block arrives at ATA protocol state machine 214, e.g., in one of the formats depicted in FIGS. 9 and 10. ATA protocol state machine 214 parses the command block, and communicates with register protocol adapter state machine 180 to perform a sequence of ATA operations necessary to execute the register-delivered transaction requested in the ATACB. FIGS. 12a, 12b, and 12c illustrate one method of state machine operation.

FIG. 12a shows the initial sequence of register access operations 230 performed when a new command block arrives at ATA protocol state machine 214. The two command block bit-mapped fields bmATACBActionSelect and bmATACBRegisterSelect are latched into state machine 214, respectively, at blocks 244 and 246.

At block 248, execution branches depending on whether the command block is reading ATA register values or writing ATA register values. The flag TaskFileRead is checked. If TaskFileRead is zero, control is transferred to block 256 (and the register write path); otherwise, control is transferred to block 250 (and the register read path).

The read path consists of blocks 250, 252, and 254. Block 250 branches based on the flag PollAltStatOverride. When this flag is set to 0, execution branches to block 252; otherwise, block 252 is bypassed and execution continues at block 254.

At block 252, ATA protocol state machine 214 instructs ATA register protocol adapter state machine 180 to poll (repeatedly read) the ATA device's Alternate Status register until the BSY bit in that register is cleared by the device. When the BSY bit is cleared, the ERR and DRQ bits from the last Alternate Status register read are returned to ATA protocol state machine 214.

Note that the flowchart would be altered slightly here with the alternate ATACB format of FIG. 10. Since this format allows the DEV bit to be set in a register read situation, block 252 may be replaced with DEV bit setting logic (see blocks 260–266 for an example) in this case. The device selection operation already polls the Alternate Status register for BSY cleared, and thus this task need not be repeated.

At block 254, ATA command protocol adapter 210 performs a register read. Using the register selection bits bmATACBRegisterSelect, state machine 214 executes up to eight reads of register values. As it steps through the register selection bits, if a bit=1 state machine 214 supplies the register address corresponding to that bit to state machine 180. State machine 180 performs the requested read and sends the register values to data buffer 208. If a register selection bit=0, state machine 214 instructs state machine 180 to send a byte value 00h to data buffer 208.

After state machine 214 has stepped through all register selection bits, it notifies command block wrapper interpreter 212 that the transaction has completed. Interpreter 212 builds an appropriate CSW for transport (back to the host)

after the packet containing the register data. Note that in this implementation, a register read will always return an eight-byte data packet. Accordingly, the dCBWDataTransferLength variable should be set to a value of eight when registers are to be read. In an alternate implementation where data was allowed to be returned in the CSW, the register values could instead by placed in the CSW and dCBWDataTransferLength could be set to 0 in the CBW.

The register write path begins at block 256. Two additional variables are latched into state machine 214: TransferLength is set initially to dCBWDataTransferLength at block 256, and BlockSize is set to ATACBTransferBlockCount at block 258.

ATA device selection is performed next, if necessary. Block 260 refers to the DeviceSelectiotiOverride bit; if the bit is clear, control branches to block 262. Block 262 refers to the DEVOverride bit. If this bit is clear, at block 264 state machine 214 instructs state machine 180 to write, to the ATA device's Device/Head register, a DEV value internally selected in the bridge. Otherwise, at block 266 state machine 214 instructs state machine 180 to write to that register the DEV value specified in the Device/Head register field of the ATACB. Note that if the DeviceSelectionOverride bit is set, the pre-existing DEV configuration is maintained.

After ATA device selection, block 268 writes the registers selected in bmATACBRegisterSelect using the values received in bATACBTaskFileWriteData. This function proceeds much like block 254—each register selection bit is examined in sequence, and if that bit is set, the corresponding task file write data byte is supplied to state machine 180 for writing to the ATA device, along with the proper register address. If a register bit is cleared, the corresponding register is left in its pre-existing state. Note that when the DEVOverride bit is set, any write to the Device/Head register will use the internally-selected DEV value. The last register written (if the last register selection bit is set) is the Command register; after writing this register, state machine 214 enters data phase 330 of the flowchart.

Referring next to FIG. 12*b*, data phase operations 330 are shown. The data phase is entered at block 344. Block 344 branches based on the flag PollAltStatOverride. When this flag is set to 0, execution branches to block 348; otherwise, execution continues at block 346.

At block 348, ATA protocol state machine 214 instructs ATA register protocol adapter state machine 180 to poll (repeatedly read) the ATA device's Alternate Status register until the BSY bit in that register is cleared by the device. When the BSY bit is cleared, the ERR and DRQ bits from the last Alternate Status register read are returned to ATA protocol state machine 214. The state machine then branches to the error check logic found in FIG. 12*c* (a discussion of FIG. 12*c* follows the discussion of FIG. 12*b*).

When the bridge is not polling the Alternate Status register, block 346 checks the variable TransferLength to see if any data remains to be transferred. If no data remains, the transaction is done, and interpreter 212 is signaled. If data remains, execution branches to block 332. Note that block 332 can also be reached from FIG. 12*c* if execution of that flowchart reaches the "Data Xfer" point.

Block 332 determines whether the amount of data left to transfer (TransferLength) is less than the current blocksize. If this comparison is true, block 338 sets ByteCount equal to TransferLength. Block 340 then sets TransferLength to zero. If the comparison of block 332 is false, block 334 sets ByteCount=Blocksize*512. Block 336 then decrements TransferLength by Blocksize*512.

Both block 336 and block 340 branch to block 342. At block 342, ByteCount bytes of data are transferred by an ATA transfer. The Direction bit (from the CBW field bmCBWFlags) determines whether ByteCount bytes will be read from data buffer 208 and written to the ATA device, or whether ByteCount bytes will be read from the ATA device and written to data buffer 208. Note that state machine 180 also conforms to the current ATA transfer mode as specified by the UDMAEnable bit. When the UDMAEnable bit is set, data transfers use ATA DMA signaling. Otherwise, data transfers use ATA PIO signaling. Optionally, adapter 210 can compare the UDMAEnable bit to the current selected data transfer mode, and set a different ATA mode on the device if a conflict exists.

After ByteCount bytes are transferred, control is returned to block 344, where more bytes of data can be transferred if more remain.

FIG. 12*c* illustrates the error check logic 280. This logic varies slightly depending on whether data remains to be transferred. Block 282 performs a check of TransferLength. If TransferLength is greater than zero, control branches to block 300; otherwise, control branches to block 284.

Block 300 checks bit 0 of DPErrorOverride. If this bit is set, phase error conditions are ignored, and control is transferred to block 310. If this bit is cleared, but DRQ is set, the device is ready to transfer data (no phase error exists), and control is transferred to block 310. Block 310 reads the ATA Status register to clear INTRQ. Control is then transferred to the data transfer phase of FIG. 12*b*.

When control reaches block 304, a phase error exists. Block 304 checks bit 1 of DPErrorOverride. If this bit is set, device error conditions are not checked, and a phase error will be reported to interpreter 212. If this bit is cleared, but block 306 determines that no device error (as reported in ERR) exists, a phase error will also be reported. Finally, if the bit is cleared but ERR is set, control branches to block 308. At block 308, the ATA Status register is read to clear INTRQ, and then a failure is reported.

The logic proceeds in a slightly different manner when no data remains to transfer. If bit 0 of DPErrorOverride is clear and DRQ is set (the ATA device still expects a data transfer), a phase error is reported. Otherwise, block 288 checks bit 1 of DPErrorOverride; if this bit is set, ERR is ignored and control is transferred to block 292. Otherwise, block 290 checks whether ERR is set, and, if set, control is transferred to block 308 for failure reporting.

Block 292 reads the ATA Status register to clear INTRQ, and then normal completion is reported to interpreter 212.

Returning for a moment to FIG. 11, the function of block 216 will be mentioned briefly. When a command block does not have an ATA signature, it is assumed to be an ATAPI command block. The ATAPI command block is essentially just the ATAPI transport protocol packet. Protocol state machine 216 is hard-wired to initiate a PACKET command upon receiving a START_ATAPI command from interpreter 212. The ATAPI command block is clocked through onto the data lines of the ATA interface when the ATAPI device is ready to receive the ATAPI packet. Note that the embodiment of FIG. 11 allows a host to read the registers of an ATAPI device and to initiate ATA commands (other than the PACKET command) on such a device by issuing an ATACB to the device.

From the preceding discussion, it can be appreciated that the described embodiments allow a host a high degree of ATA functionality from a location remote to the ATA bus. A given ATA transaction or set of register accesses can be initiated via one packet. The bridging device then performs an appropriate sequence of ATA operations necessary to execute the given ATA register-delivered transaction. During this time period, the host is free to perform other functions without waiting for the ATA device to respond. The bridging device handles the asynchronous ATA timing issues without intervention from the host.

Different levels of control can be enabled by changing the division of labor between the ATA host driver and the ATA command protocol adapter. For instance, a PACKET (A0h) transaction may be performed using multiple command blocks. Consecutive command blocks initiate register accesses to handle all portions of the necessary protocol. This is but one example of how the present description could be modified to adjust the host/bridge duty division.

The Multiple type ATA commands may be used to increase ATA bus efficiency. For instance, the protocol can allow bATACBTransferBlockCount to differ from "Sectors per block" as set in the last SET_MULTIPLE_MODE command. If such a difference exists, the bridge can be configured to automatically issue a new SET_MULTIPLE_MODE command, or to set the mode if currently unset. This is but one example of how the present description could be modified to adjust the ATA bus efficiency.

Although the above embodiments have referred to USB 1.0 and its Mass Storage Class, these are merely exemplary. A working embodiment need not use the MSC. The present invention is also applicable to USB 2.0, as well as to other packet data transport protocols.

Although the above description focuses on a hardware bridge implementation, the described methods are also appropriate for software implementation. As such, the scope of the present invention extends to an apparatus comprising a computer-readable medium containing computer instructions that, when executed, cause a processor or multiple communicating processors to perform one of the described methods.

One of ordinary skill in the art will recognize that the concepts taught herein can be tailored to a particular application in many other advantageous ways. Although the specification may refer to "an", "one", "another", or "some" embodiment(s) in several locations, this does not necessarily mean that each such reference is to the same embodiment(s), or that the feature only applies to a single embodiment.

What is claimed is:

1. A method of controlling an ATA device using packet-based communication between a host and a packet-to-ATA bridge, the method comprising
   at the host:
      formatting the ATA register accesses necessary to execute a given ATA register-delivered transaction into a command block; and
      transmitting the command block to the packet-to-ATA bridge in a packet format, and
   at the packet-to-ATA bridge:
      parsing the command block into a sequence of ATA operations necessary to execute the given ATA register-delivered transaction;
      communicating with an ATA device attached to the bridge via an ATA interface to execute the sequence of ATA operations on the ATA device; and
      when the given ATA register-delivered transaction requests the values for one or more registers on the ATA device, returning the register values to the host in packet format.

2. The method of claim 1, wherein the command block comprises a group of register selection flags, each flag corresponding to an ATA-defined register, and wherein formatting the ATA register accesses comprises setting the register selection flags for the registers that will be accessed in the given ATA register-delivered transaction.

3. The method of claim 2, wherein parsing the command block into a sequence of ATA operations comprises arranging the sequence in an order according to the order of the register selection flags.

4. The method of claim 2, wherein formatting the ATA register accesses further comprises placing values to be written to the ATA device in command block fields corresponding to the register selection flags.

5. The method of claim 2, wherein the register values are returned to the host in a packet format having one field for each ATA-host-readable register, the fields filled in by the bridge according to the register selection flags.

6. The method of claim 5, wherein the register values are returned in a data packet rather than in a control packet.

7. The method of claim 1, wherein the host is allowed to send a second command block to the bridge before receiving an indication that the first command block has been completed, the bridge buffering the second command block until the first command block completes.

8. The method of claim 1, further comprising, at the host, inserting a defined signature into the command block to indicate that the command block refers to an ATA command and not to an ATAPI packet.

9. The method of claim 1, further comprising, at the host, setting a group of action selection flags in the command block, the action selection flags further refining the mode in which the bridge is to communicate with the ATA device.

10. A method of operating a packet-to-ATA bridge, the method comprising:
   receiving a packet comprising an ATA command block from a remote host, the ATA command block comprising the ATA register accesses necessary to execute a given ATA register-delivered transaction;
   parsing the command block into a sequence of ATA register operations necessary to execute the given ATA register-delivered transaction;
   communicating with an ATA device attached to the bridge via an ATA interface to execute the sequence of ATA register operations on the ATA device; and
   when the given ATA register-delivered transaction requests the values for one or more registers on the ATA device, returning the register values to the host in packet format.

11. The method of claim 10, wherein the command block comprises a group of register selection flags, each flag corresponding to an ATA-defined register, and wherein parsing the command block comprises sequencing a register access for each register selection flag that is set in the command block.

12. The method of claim 11, wherein parsing the command block into a sequence of ATA operations further comprises arranging the sequence in an order according to the order of the register selection flags.

13. The method of claim 11, wherein the command block further comprises a group of write register fields, each field corresponding to one of the register selection flags, and wherein, when a register selection flag is set, the method further comprises writing the corresponding register selection field to the ATA device register corresponding to that field.

14. The method of claim 11, wherein the register values are returned to the host in a packet format having one field for each ATA-host-readable register, the fields filled in by the bridge according to the register selection flags.

15. The method of claim 14, wherein the register values are returned in a data packet rather than in a control packet.

16. The method of claim 10, wherein the host is allowed to send a second command block to the bridge before receiving an indication that the first command block has been completed, the bridge buffering the second command block until the first command block completes.

17. The method of claim 10, wherein the command block further comprises a group of action selection flags, the method further comprising referring to one or more of the flags in order to further define how the bridge is to communicate with the ATA device for that command block.

18. An apparatus comprising a packet-to-ATA bridge, the bridge comprising:
- a packet data interface to receive ATA register-delivered-command packets and data packets from a remote host, and to transmit data and status packets to the remote host;
- an ATA interface to transmit ATA bus host signals to an ATA device and receive ATA device signals from the device;
- buffer memory to buffer data between the packet data interface and the ATA interface;
- an ATA register protocol adapter connected to the ATA interface, the adapter capable of performing ATA register operations with an ATA device attached to the ATA signal interface; and
- an ATA command protocol adapter to parse a command packet into a sequence of ATA register operations and cause that sequence of operations to be performed by the ATA register protocol adapter.

19. The apparatus of claim 18, further comprising the ATA device.

20. The apparatus of claim 18, further comprising a cable having a first end adapted for connection to a packet data port and a second end adapted for connection to the ATA device, the first end connected to the packet data interface of the packet-to-ATA-bridge, the second end connected to the ATA interface of the packet-to-ATA bridge, the majority of the cable lying on the packet data interface side of the packet-to-ATA bridge.

21. The apparatus of claim 18, wherein the bridge further comprises a command packet buffer capable of storing at least one command packet while another command packet is in process by the ATA command protocol adapter.

22. The apparatus of claim 18, wherein the ATA command protocol adapter further comprises an ATAPI protocol adapter to load ATAPI command packets to the ATA device.

23. The apparatus of claim 18, wherein the ATA command protocol adapter comprises a state machine adapted to interface with the ATA register protocol adapter, the state machine having one logical execution path for reading any number of the registers of an ATA device in response to a command packet, and another logical execution path for writing any number of the registers of an ATA device in response to the command packet, wherein the specific registers to be read or written are specified in the command packet.

24. An apparatus comprising a computer-readable medium containing computer instructions that, when executed, cause a processor or multiple communicating processors to perform a method for operating a packet-to-ATA bridging device, the method comprising:
- receiving a packet comprising an ATA command block from a remote host, the ATA command block comprising the ATA register accesses necessary to execute a given ATA register-delivered transaction;
- parsing the command block into a sequence of ATA register operations necessary to execute the given ATA register-delivered transaction;
- communicating with an ATA device attached to the bridge via an ATA interface to execute the sequence of ATA register operations on the ATA device; and
- when the given ATA register-delivered transaction requests the values for one or more registers on the ATA device, returning the register values to the host in packet format.

25. The apparatus of claim 24, wherein the command block comprises a group of register selection flags, each flag corresponding to an ATA-defined register, and wherein parsing the command block comprises sequencing a register access for each register selection flag that is set in the command block.

26. The apparatus of claim 25, wherein the command block further comprises a group of write register fields, each field corresponding to one of the register selection flags, and wherein, when a register selection flag is set, the method further comprises writing the corresponding register selection field to the ATA device register corresponding to that field.

27. The apparatus of claim 25, wherein the register values are returned to the host in a packet format having one field for each ATA-host-readable register, the fields filled in by the bridge according to the register selection flags.

* * * * *

UNITED STATES PATENT AND TRADEMARK OFFICE
CERTIFICATE OF CORRECTION

PATENT NO. : 6,618,788 B1
DATED : September 9, 2003
INVENTOR(S) : Jacobs

It is certified that error appears in the above-identified patent and that said Letters Patent is hereby corrected as shown below:

Column 6,
Line 51, "field (bytes. 0-3) is" should read -- field (bytes 0-3) is --.

Column 8,
Line 19, "register, bmATACBRegisterselected indicates" should read -- registers, bmATACBRegisterSelect indicates --.
Line 39, ""SET_MULTIPLE_Mode" ATA" should read -- "SET_MULTIPLE_MODE" ATA --.

Column 11,
Line 15, "the DeviceSelectiotiOverride bit;" should read -- DeviceSelection Override bit; --.

Signed and Sealed this

Twenty-eighth Day of June, 2005

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,618,788 B1 |
| APPLICATION NO. | : 09/671554 |
| DATED | : September 9, 2003 |
| INVENTOR(S) | : Daniel G. Jacobs |

Page 1 of 1

It is certified that error appears in the above-identified patent and that said Letters Patent is hereby corrected as shown below:

On Title Page, item (*) Notice, "0 days" should be changed to --505 days--.

Signed and Sealed this

Sixth Day of April, 2010

David J. Kappos
*Director of the United States Patent and Trademark Office*